(12) United States Patent
Sato

(10) Patent No.: US 11,415,293 B2
(45) Date of Patent: Aug. 16, 2022

(54) VEHICLE LAMP

(71) Applicant: STANLEY ELECTRIC CO., LTD., Tokyo (JP)

(72) Inventor: Koji Sato, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/505,694

(22) Filed: Oct. 20, 2021

(65) Prior Publication Data

US 2022/0128214 A1 Apr. 28, 2022

(30) Foreign Application Priority Data

Oct. 23, 2020 (JP) .............................. JP2020-178223

(51) Int. Cl.
*F21S 43/20* (2018.01)
*F21S 43/236* (2018.01)

(52) U.S. Cl.
CPC ............. *F21S 43/26* (2018.01); *F21S 43/236* (2018.01)

(58) Field of Classification Search
CPC .......... F21S 43/14; F21S 43/26; F21S 43/236; F21S 43/235; B60Q 1/44
See application file for complete search history.

(56) References Cited

U.S. PATENT DOCUMENTS

| 5,361,190 A * | 11/1994 | Roberts | F21S 43/14 |
| | | | 362/135 |
| 11,230,225 B1 * | 1/2022 | Stefanov-Wagner | |
| | | | B60Q 1/0408 |
| 2015/0316227 A1 * | 11/2015 | Sahlin | G02B 6/0076 |
| | | | 362/511 |
| 2017/0267163 A1 * | 9/2017 | Watanabe | F21S 43/241 |

FOREIGN PATENT DOCUMENTS

JP 2018-106941 A 7/2018

* cited by examiner

*Primary Examiner* — Matthew J. Peerce
(74) *Attorney, Agent, or Firm* — Kenealy Vaidya LLP

(57) ABSTRACT

A function member is disposed between a second lens cover and a second lighting unit so as to overlap the third light emitting area when seen in a front view, and the function member has a function of, when the light emitting surface is seen in a front view, transmitting through light emitted in the third light emitting area, and a function of, when the light emitting surface is seen from a view from diagonally above, blocking light emitted above than a first light emitting area and a second light emitting area among the light emitted in the third light emitting area, and transmitting through light emitted between the first light emitting area and the second light emitting area among the light emitted in the third light emitting area.

6 Claims, 8 Drawing Sheets

E3'  E1', E2'

E1'  E3'  E2'

VEHICLE LAMP

CROSS-REFERENCE TO RELATED APPLICATION

Priority is claimed on Japanese Patent Application No. 2020-178223, filed Oct. 23, 2020, the content of which is incorporated herein by reference.

BACKGROUND OF THE INVENTION

Field of the Invention

The present invention relates to a vehicle lamp.

Description of Related Art

For example, a vehicle lamp in which rear combination lamps mounted on both corner portions on a rear end side of a vehicle and lid lamps mounted on a back gate or a trunk lid of the vehicle are arranged in a vehicle width direction has been disclosed (for example, see Japanese Unexamined Patent Application, First Publication No. 2018-106941).

The rear combination lamps and the lid lamp have a light source and an elongated light guide body that are disposed inside a lighting body, light emitted from the light source enters the light guide body from a base end side thereof, and the light is guided toward a tip side of the light guide body. In addition, light reflected by a plurality of reflection cuts provided on a back surface side of the light guide body is emitted from a front surface side of the light guide body to the outside. Accordingly, it is possible to emit light from a light emitting area provided on the front surface side of the light guide body.

SUMMARY OF THE INVENTION

Incidentally, in the above-mentioned vehicle lamp, a dark section may be generated between a light emitting area on the side of the lid lamp and a light emitting area on the side of the rear combination lamp due to a gap generated between the lid lamp and the rear combination lamp, and in some cases, deterioration of lighting feeling such as deterioration in the light emission appearance occurs.

For this reason, in the invention disclosed in Japanese Unexamined Patent Application, First Publication No. 2018-106941, light from the light emitting section provided behind a space between the lid lamp and the rear combination lamp is radiated toward the gap, light is emitted from a light emitting surface in which the light emitting area on the side of the lid lamp and the light emitting area on the side of the rear combination lamp are continuous with each other (seamless emission), and thus, the appearance of light emission is improved.

However, in the invention disclosed in Japanese Unexamined Patent Application, First Publication No. 2018-106941, when a viewing direction with respect to the light emitting surface of the vehicle lamp was changed to viewing from diagonally upward from viewing from a front view, it was found that what was visually recognized as a continuous light emitting surface in the vehicle width direction when seen in a front view is visually recognized as a discontinuous light emitting surface when seen in an oblique upward view.

As shown in FIG. 12, this is caused by the fact that a light emitting area E3' on the side of the light emitting section is disposed behind a light emitting area E1' on the side of the lid lamp and a light emitting area E2' on the side of the rear combination lamp. That is, when the light emitting surface is visually recognized from diagonally above, as shown in FIG. 13, it is visually recognized in a state in which the light emitting area E3' on the side of the light emitting section is protruding upward from between the light emitting area E1' on the side of the lid lamp and the light emitting area E2' on the side of the rear combination lamp.

Accordingly, in the invention disclosed in Japanese Unexamined Patent Application, First Publication No. 2018-106941, there is a problem in which connection of light emission between the lid lamp and the rear combination lamp is deteriorated when a viewing direction is changed from a front view to an oblique upward view.

An aspect of the present invention is directed to providing a vehicle lamp capable of improving an appearance of light emission between a lid lamp and a rear combination lamp when a viewing direction is changed from a front view to an oblique upward view.

The present invention provides the following configurations.

(1) A vehicle lamp in which rear combination lamps mounted on both corner portions of a rear end side of a vehicle and a lid lamp mounted on a back gate or a trunk lid of the vehicle are arranged in a vehicle width direction,
wherein the lid lamp has a configuration in which
a first lighting unit is disposed inside a first lighting body constituted by a first housing having a front surface that is open and a first lens cover configured to cover an opening of the first housing, and
the first lighting unit causes a first light emitting area to emit light,
the rear combination lamp has a configuration in which
a second lighting unit is disposed inside a second lighting body constituted by a second housing having a front surface that is open and a second lens cover configured to cover an opening of the second housing, and
the second lighting unit causes each of a second light emitting area and a third light emitting area to emit light, the third light emitting area being an area provided between the first light emitting area and the second light emitting area and positioned at a back side than the first light emitting area and the second light emitting area,
the first light emitting area, the second light emitting area and the third light emitting area constitute a light emitting surface continuous in the vehicle width direction when seen in a front view,
a functional member is disposed between the second lens cover and the second lighting unit so as to overlap the third light emitting area when seen in a front view, and
the functional member has a function of, when the light emitting surface is seen in a front view, transmitting through light emitted in the third light emitting area, and a function of, when the light emitting surface is seen from a view from diagonally above, blocking light emitted above than the first light emitting area and the second light emitting area among the light emitted in the third light emitting area, and transmitting through light emitted between the first light emitting area and the second light emitting area among the light emitted in the third light emitting area.

(2) The vehicle lamp according to the above-mentioned (1), wherein the function member is constituted by a louver film in which light shielding films are interposed between each of light transmission layers overlapping in an upward/downward direction, and
the louver film is provided in a state in which an upper side thereof is inclined toward a front surface side.

(3) The vehicle lamp according to the above-mentioned (1), wherein the function member is constituted by a louver film in which light shielding films are interposed between each of light transmission layers overlapping in an upward/downward direction, and the louver film is provided in a state in which an interval between the light shielding films arranged in the upward/downward direction in made smaller at an upper part of the louver film.

(4) The vehicle lamp according to the above-mentioned (1), wherein the function member is constituted by a louver film in which light shielding films are interposed between each of light transmission layers overlapping in an upward/downward direction, and the louver film is provided in a state in which the light shielding film in an upper side of the louver film is inclined upward.

(5) The vehicle lamp according to any one of the above-mentioned (1) to (4), wherein a surface of the first lens cover corresponding to the first light emitting area and a surface of the second lens cover corresponding to the second light emitting area are disposed on a same plane on a front surface side, a step surface is provided between the surface of the second lens cover corresponding to the second light emitting area and a surface of the second lens cover corresponding to the third light emitting area, and the surface of the second lens cover corresponding to the third light emitting area is disposed on a back surface side of the first housing and is provided facing a part of the first housing.

(6) The vehicle lamp according to any one of the above-mentioned (1) to (5), wherein the rear combination lamp includes an auxiliary light source configured to emit light toward a lower side of the third light emitting area, and the function member has a function of blocking light emitted from the auxiliary light source when the light emitting surface is seen in a front view and of transmitting through light emitted from the auxiliary light source when the light emitting surface is seen from a view from diagonally above.

According to the aspect of the present invention, it is possible to provide a vehicle lamp capable of improving the appearance of light emission between a lid lamp and a rear combination lamp when a viewing direction is changed from a front view to an oblique upward view.

DETAILED DESCRIPTION OF THE INVENTION

Figure 1:
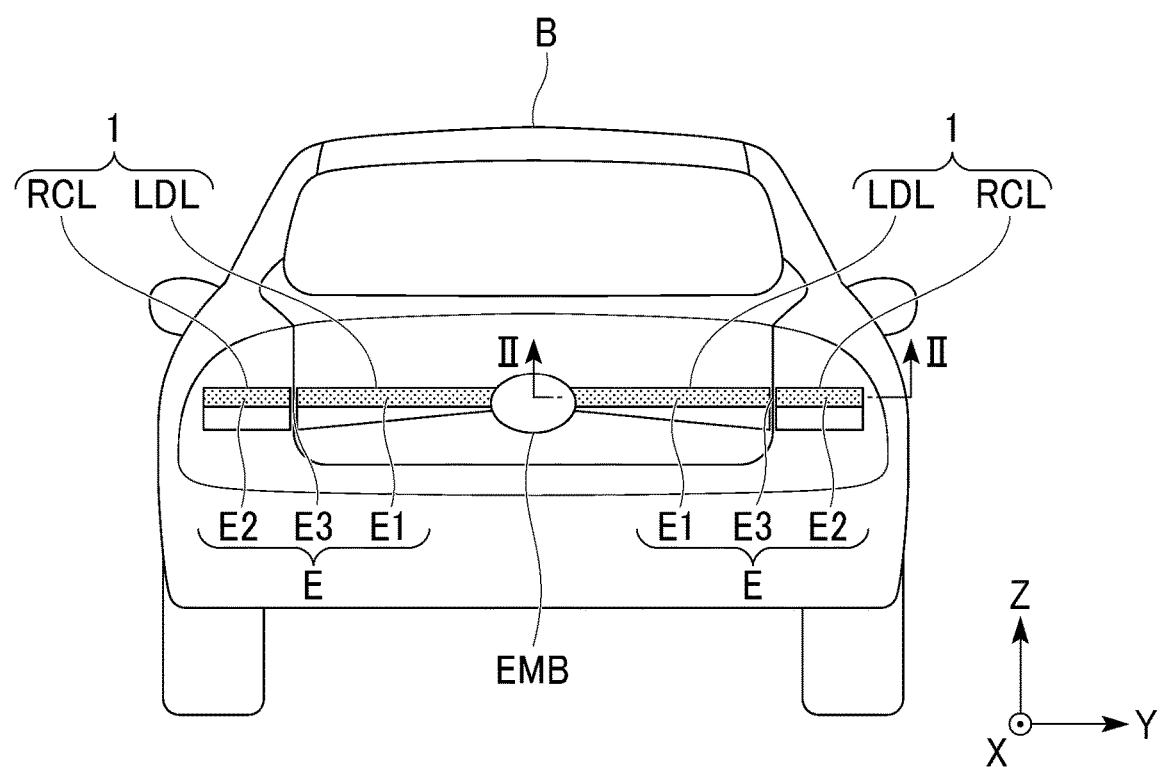
FIG. 1 is a front view of a backside of a vehicle including a vehicle lamp according to an embodiment of the present invention.

Hereinafter, an embodiment of the present invention will be described in detail with reference to the accompanying drawings.

Further, in the drawings used in the following description, in order to make each of components easier to see, the dimensional scale may be different depending on the component, and dimensional ratios or the like of each of components may not always be the same as actual ones.

Hereinafter, in the drawings described below, an XYZ orthogonal coordinates system is set, an X-axis direction indicates a forward/rearward direction (a lengthwise direction) in a vehicle, a Y-axis direction indicates a leftward/rightward direction (a widthwise direction) in the vehicle, and a Z-axis direction indicates an upward/downward direction (a height direction) in the vehicle.

Figure 2:
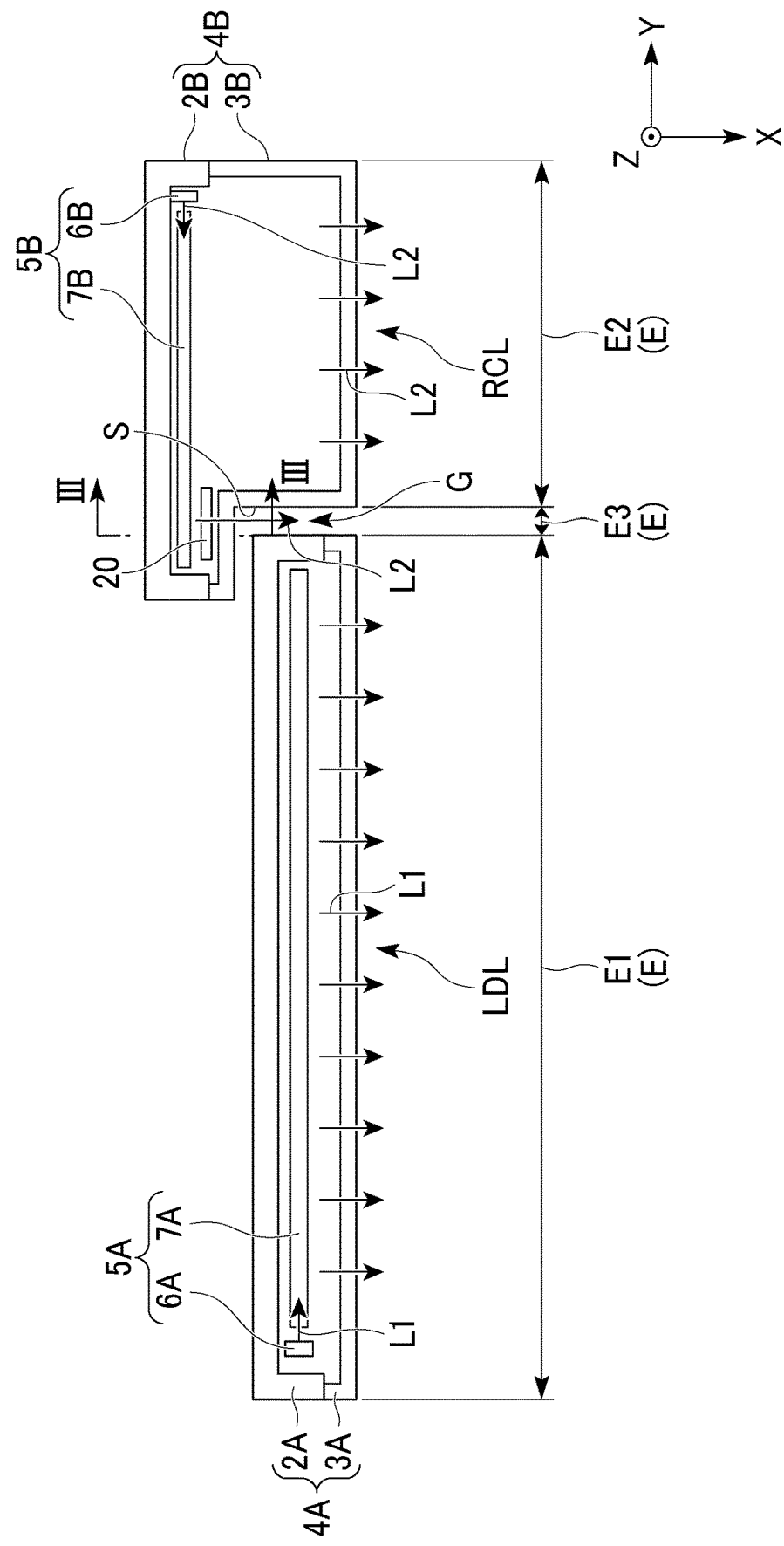
FIG. 2 is a cross-sectional view of the vehicle lamp along a line segment II-II shown in FIG. 1.
Figure 3:
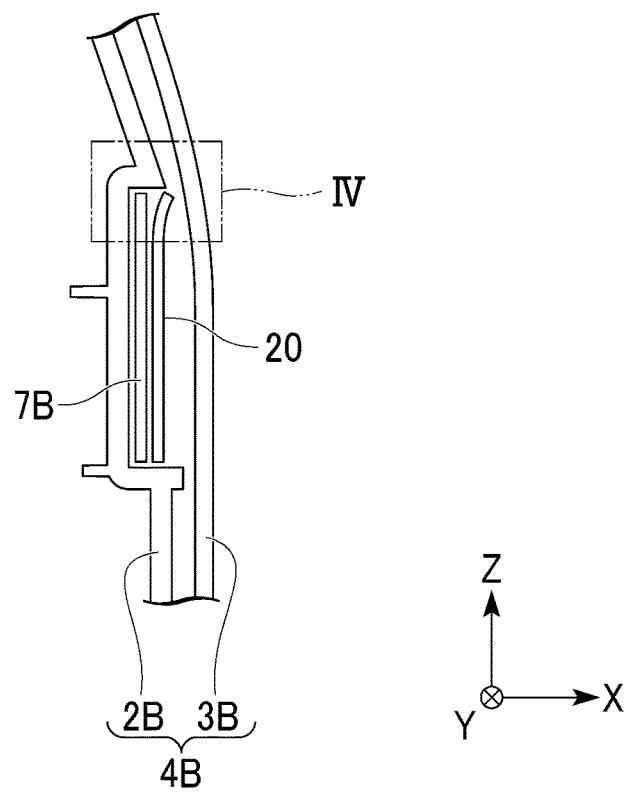
FIG. 3 is a cross-sectional view of the vehicle lamp along line segment III-III shown in FIG. 2.
Figure 4:
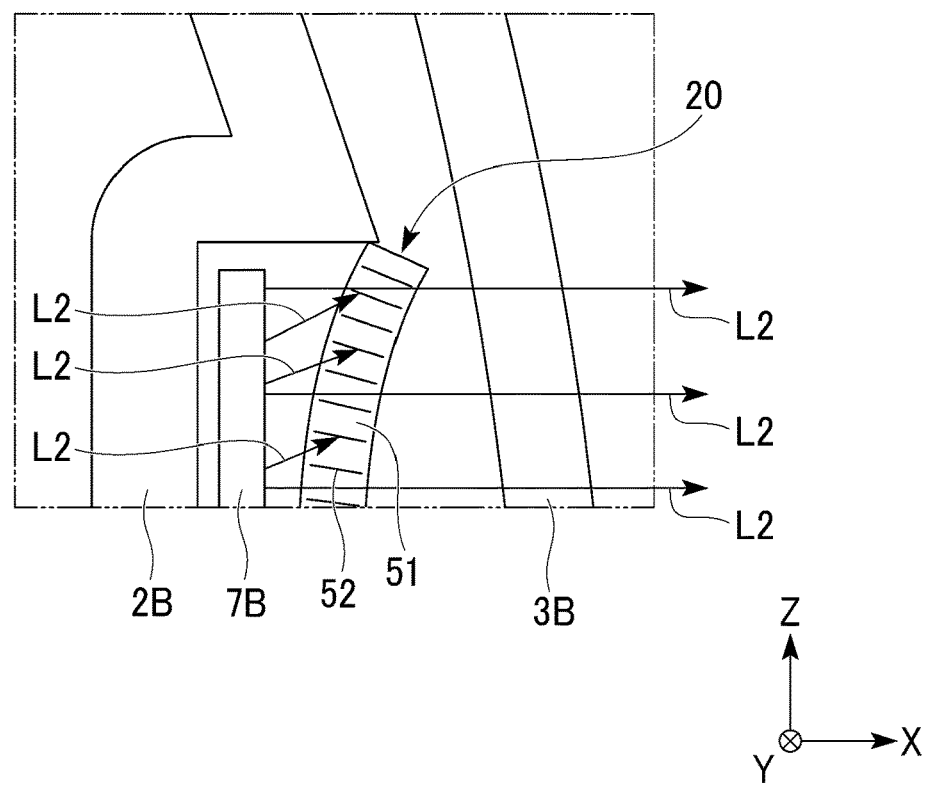
FIG. 4 is a cross-sectional view of the vehicle lamp when an enclosing portion IV shown in FIG. 3 is enlarged.
Figure 5:
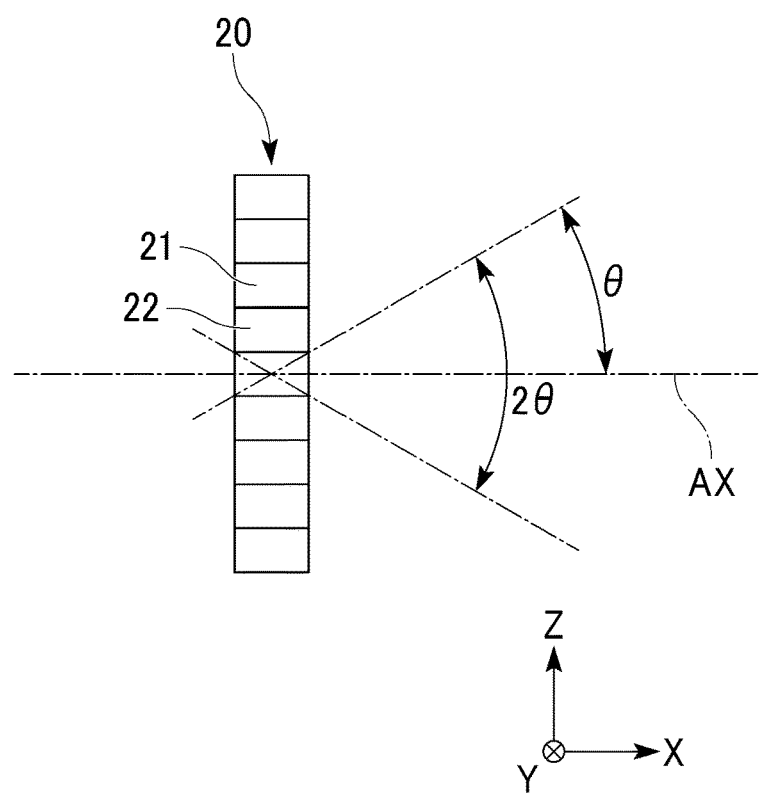
FIG. 5 is a cross-sectional view showing a configuration of a louver film.
Figure 6:
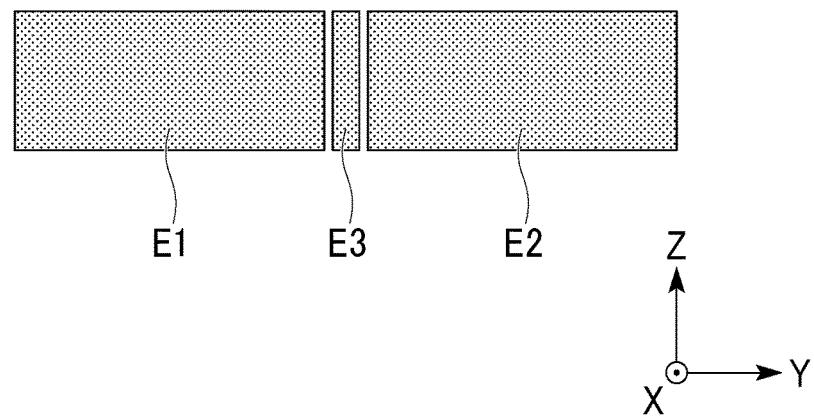
FIG. 6 is a schematic view of a light emitting surface when seen in a front view.
Figure 7:
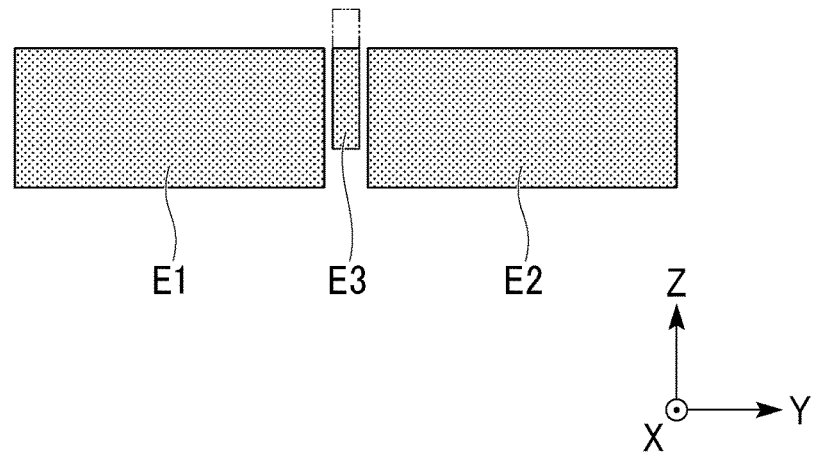
FIG. 7 is a schematic view of the light emitting surface when seen from diagonally above.

As an embodiment of the present invention, for example, a vehicle lamp 1 shown in FIG. 1 to FIG. 7 will be described. Further, FIG. 1 is a front view of a backside of a vehicle B including the vehicle lamp 1. FIG. 2 is a cross-sectional view of the vehicle lamp 1 along a line segment II-II shown in FIG. 1. FIG. 3 is a cross-sectional view of the vehicle lamp 1 along a line segment shown in FIG. 2. FIG. 4 is a cross-sectional view of the vehicle lamp 1 when an enclosing portion IV shown in FIG. 3 is enlarged. FIG. 5 is a cross-sectional view showing a configuration of a louver film 20. FIG. 6 is a schematic view of a light emitting surface E when seen in a front view. FIG. 7 is a schematic view of the light emitting surface E when seen from diagonally above.

The vehicle lamp 1 of the embodiment includes, for example, as shown in FIG. 1, rear combination lamps RCL mounted on both corner portions of a rear end side of the vehicle B, and lid lamps LID mounted on both of left and right sides of a back gate or a trunk lid of the vehicle B. The rear combination lamps RCL and the lid lamps LID are arranged in a widthwise direction of the vehicle B (hereinafter, referred to as a vehicle width direction).

Further, in the embodiment, a configuration of the vehicle lamp 1 will be described using the lid lamp LID and the rear combination lamp RCL disposed on a right side of a rear section of the vehicle B, as an example, among the lid lamps LID and the rear combination lamps RCL symmetrically disposed at the rear section.

In addition, directions of forward, rearward, leftward, rightward, upward and downward in the following description are the same as directions in the vehicle lamp 1 when looking towards the front surface thereof (from behind the vehicle B) unless the context clearly indicates otherwise. Accordingly, directions in forward, rearward, leftward and rightward are inverted compared to the directions when looking towards a front surface of the vehicle B (a front side of the vehicle B).

The vehicle lamp 1 of the embodiment includes a first light emitting area E1 that emits red light in a line shape in the lid lamp LID, a second light emitting area E2 that emits red light in a line shape in the rear combination lamp RCL, and a third light emitting area E3 that emits red light between the first light emitting area E1 and the second light emitting area E2.

The first light emitting area E1, the second light emitting area E2 and the third light emitting area E3 function as a tail light (a tail lamp), and configure the light emitting surface E which is continuous in the vehicle width direction when seen in a front view.

The lid lamp LID has a configuration, as shown in FIG. 2, in which a first lighting unit 5A is disposed inside a first lighting body 4A constituted by a first housing 2A having a front surface that is open and a transparent first lens cover 3A configured to cover the opening of the first housing 2A.

The first lighting unit 5A has a first light source 6A and a first light guide body 7A. The first lighting unit 5A causes first light L1 emitted from the first light source 6A to enter the first light guide body 7A from an inner side end portion of the first light guide body 7A (a base end side), and guides the first light L1 toward an outer side end portion of the first light guide body 7A (a tip side) while repeating reflection inside the first light guide body 7A. In addition, the first light L1 reflected by a plurality of reflection cuts (not shown) provided on a back surface side of the first light guide body 7A is emitted to the outside from a front surface side of the first light guide body 7A.

Accordingly, the lid lamp LID can cause the first light emitting area E1 provided on the front surface side of the first lens cover 3A to emit red light.

Similarly, the rear combination lamp RCL has a configuration in which a second lighting unit 5B is disposed inside a second lighting body 4B constituted by a second housing 2B having a front surface that is open and a transparent second lens cover 3B configured to cover the opening of the second housing 2B.

The second lighting unit 5B has a second light source 6B and a second light guide body 7B. The second lighting unit 5B causes the second light L2 emitted from the second light source 6B to enter the second light guide body 7B from an outer side end portion of the second light guide body 7B (a base end side), and guides the second light L2 toward an inner side end portion of the second light guide body 7B (a tip side) while repeating reflection inside the second light guide body 7B. In addition, the second light L2 reflected by a plurality of reflection cuts (not shown) provided on a back surface side of the second light guide body 7B is emitted to the outside from a front surface side of the second light guide body 7B.

Accordingly, the rear combination lamp RCL can cause the second light emitting area E2 and the third light emitting area E3 provided on a front surface side of the first lens cover 3A to emit red light.

The first light source 6A and the second light source 6B are constituted by light emitting diodes (LEDs) configured to emit red right (hereinafter, simply referred to as "light"). In addition, the number of each of the first and second light sources 6A and 6B is not limited to one and may be plural.

Each of the first light guide body 7A and the second light guide body 7B is constituted by a colorless transparent light transmissive member, for example, of a transparent resin such as polycarbonate, acryl, or the like, glass, or the like. Among these, the first light guide body 7A extends from a position facing the first light source 6A toward an outer side in the vehicle width direction. Meanwhile, the second light guide body 7B extends from a position facing the second light source 6B toward an inner side in the vehicle width direction.

Each of the first lens cover 3A and the second lens cover 3B is constituted by a red transparent light transmissive member as an outer lens. Accordingly, in the vehicle lamp 1 of the embodiment, the first lens cover 3A emits red light as a surface that constitutes the first light emitting area E1, and the second lens cover 3B emits red light as a surface that constitutes the second light emitting area E2 and the third light emitting area E3.

In the vehicle lamp 1 of the embodiment, the third light emitting area E3 is disposed on a back surface side of the first light emitting area E1 and the second light emitting area E2.

Specifically, in the vehicle lamp 1, a surface of the first lens cover 3A corresponding to the first light emitting area E1 and a surface of the second lens cover 3B corresponding to the second light emitting area E2 are disposed on the same plane on the front surface side. A step surface S extending in the forward/rearward direction is provided between a surface of the second lens cover 3B corresponding to the second light emitting area E2 and a surface of the second lens cover 3B corresponding to the third light emitting area E3. The surface of the second lens cover 3B corresponding to the third light emitting area E3 is disposed on a back surface side of the first housing 2A, and provided facing a part of the first housing 2A.

In the vehicle lamp 1 of the embodiment, the second light L2 emitted from the surface of the second lens cover 3B corresponding to the third light emitting area E3 is radiated toward the front surface side from a gap G generated between the surface of the first lens cover 3A corresponding to the first light emitting area E1 and the surface of the second lens cover 3B corresponding to the second light emitting area E2.

Accordingly, in the vehicle lamp 1 of the embodiment, as shown in FIG. 1, it is possible to emit light from the first light emitting area E1 on the side of the lid lamps LID and the second light emitting area E2 on the side of the rear combination lamps RCL as an one continuous light emitting surface E via the third light emitting area E3 (seamless emission).

Incidentally, the vehicle lamp 1 of the embodiment includes the louver film 20 as shown in FIG. 2 to FIG. 5.

The louver film 20 is constituted by a function member in which light shielding films 22 are interposed between light transmission layers 21 overlapping in the upward/downward direction. In addition, the louver film 20 has a structure having a flat shape and in which the light shielding films 22, which extends parallel to the leftward/rightward direction (the vehicle width direction), are arranged at equal intervals in the upward/downward direction when seen in a front view.

Accordingly, the light entering at a predetermined angle θ (upper and lower angle ranges are 2θ) in the upward/downward direction with respect to a central axis AX of the light transmission layers 21 can be transmitted through the louver film 20, and the light exceeding the angle θ can be blocked by the light shielding films 22. Further, in the embodiment, for example, the angle θ is set to 30°.

The louver film 20 is disposed between the second lens cover 3B and the second light guide body 7B (the second lighting unit 5B) so as to overlap the third light emitting area E3 when seen in a front view while facing the second light guide body 7B. In addition, the louver film 20 is provided in a state in which an upper side thereof is inclined toward the front surface side (the side of the second lens cover 3B).

The louver film 20 has a function of transmitting the second light L2 emitted in the third light emitting area E3 when the light emitting surface E is visually recognized from the front surface side (when seen in a front view). That is, among the second light L2 emitted in the third light emitting area E3, the second light L2 directed toward the front surface side is not blocked by the light shielding films 22 of the louver film 20 and is transmitted through the light transmission layers 21.

Accordingly, in the vehicle lamp 1 of the embodiment, as shown in FIG. 6, when the light emitting surface E is seen in a front view, the third light emitting area E3 disposed on the back surface side of the first light emitting area E1 and the second light emitting area E2 is visually recognized from the gap G between the first light emitting area E1 and the second light emitting area E2, and thus, it is visually recognized as the light emitting surface E continuous in the vehicle width direction.

Meanwhile, the louver film 20 has a function of blocking the second light L2 emitted above the first light emitting area E1 and the second light emitting area E2 among the second light L2 emitted in the third light emitting area E3 and transmitting the second light L2 emitted between the first light emitting area E1 and the second light emitting area E2, when the light emitting surface E is visually recognized from diagonally above (when seen from an oblique upward view).

That is, among the second light L2 emitted in the third light emitting area E3, the second light L2 directed diagonally upward is blocked by the light shielding films 22 when entering an upper side of the louver film 20. Meanwhile, the second light L2 directed toward the front surface side is not blocked by the light shielding films 22 of the louver film 20 and transmits through the light transmission layers 21.

Accordingly, in the vehicle lamp 1 of the embodiment, as shown in FIG. 7, when the light emitting surface E is seen from diagonally above, among the third light emitting area E3 disposed on the back surface side of the first light emitting area E1 and the second light emitting area E2, a portion of the third light emitting area E3 protruding upward than the first light emitting area E1 and the second light emitting area E2 is blocked and a portion between the first light emitting area E1 and the second light emitting area E2 is visually recognized from the gap G, and thus, continuous light emitting surface E in the vehicle width direction can be recognized.

In the vehicle lamp 1 of the embodiment, when a viewing direction with respect to the light emitting surface E is changed from a front view to a view from diagonally above, since the third light emitting area E3 is not visually recognized in a state protruding upward from between the first light emitting area E1 and the second light emitting area E2, connection feeling (uniformity) of light emission between the lid lamp LID and the rear combination lamp RCL can be maintained.

As described above, in the vehicle lamp 1 of the embodiment, appearance of light emission between the lid lamp LID and the rear combination lamp RCL can be improved when a viewing direction is changed from a front view to a view from diagonally above.

Further, the present invention is not necessarily limited to the embodiment and various modifications may be made without departing from the scope of the present invention.

Figure 8A:
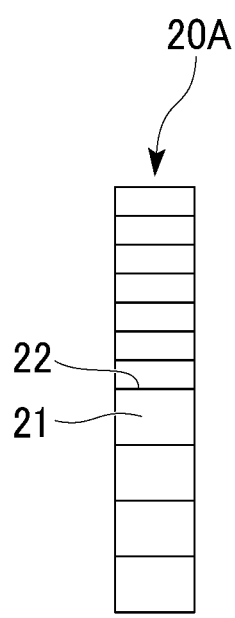
FIG. 8A is a cross-sectional view exemplarily showing a variant of a louver film.
Figure 8B:
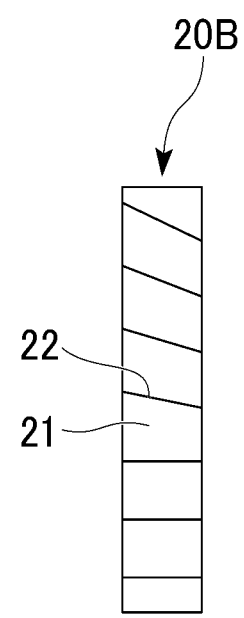
FIG. 8B is a cross-sectional view exemplarily showing a variant of the louver film.

For example, in the vehicle lamp 1, a configuration in which the louver films 20A and 20B as shown in FIG. 8A and FIG. 8B are disposed instead of the above-mentioned louver film 20 may be provided.

Among these, the louver film 20A shown in FIG. 8A has a configuration in which an interval between the light shielding films 22 arranged in the upward/downward direction is made smaller at an upper side of the louver file 20A. When such louver film 20A is used, without inclining the upper side of the louver film 20A toward the front surface side (the side of the second lens cover 3B), it is possible to obtain a function of blocking the second light L2 emitted above than the first light emitting area E1 and the second light emitting area E2 in a view from diagonally above.

Meanwhile, the louver film 20B shown in FIG. 8B is provided in a state in which the light shielding films 22 on the upper side is inclined upward. When such louver film 20B is used, without inclining the upper side of the louver film 20B toward the front surface side (the side of the second lens cover 3B), it is possible to obtain a function of blocking the second light L2 emitted above than the first light emitting area E1 and the second light emitting area E2 in a view from diagonally above.

Further, in the above mentioned louver film 20, while a light shielding film 22 on the upper side is inclined upward by curving the upper side, the louver film 20 may have a configuration in which the upper side is bent. In addition, in the above mentioned louver film 20, the bent portion is not limited to one and two or more bent portions may be provided in the upward/downward direction.

Figure 9:
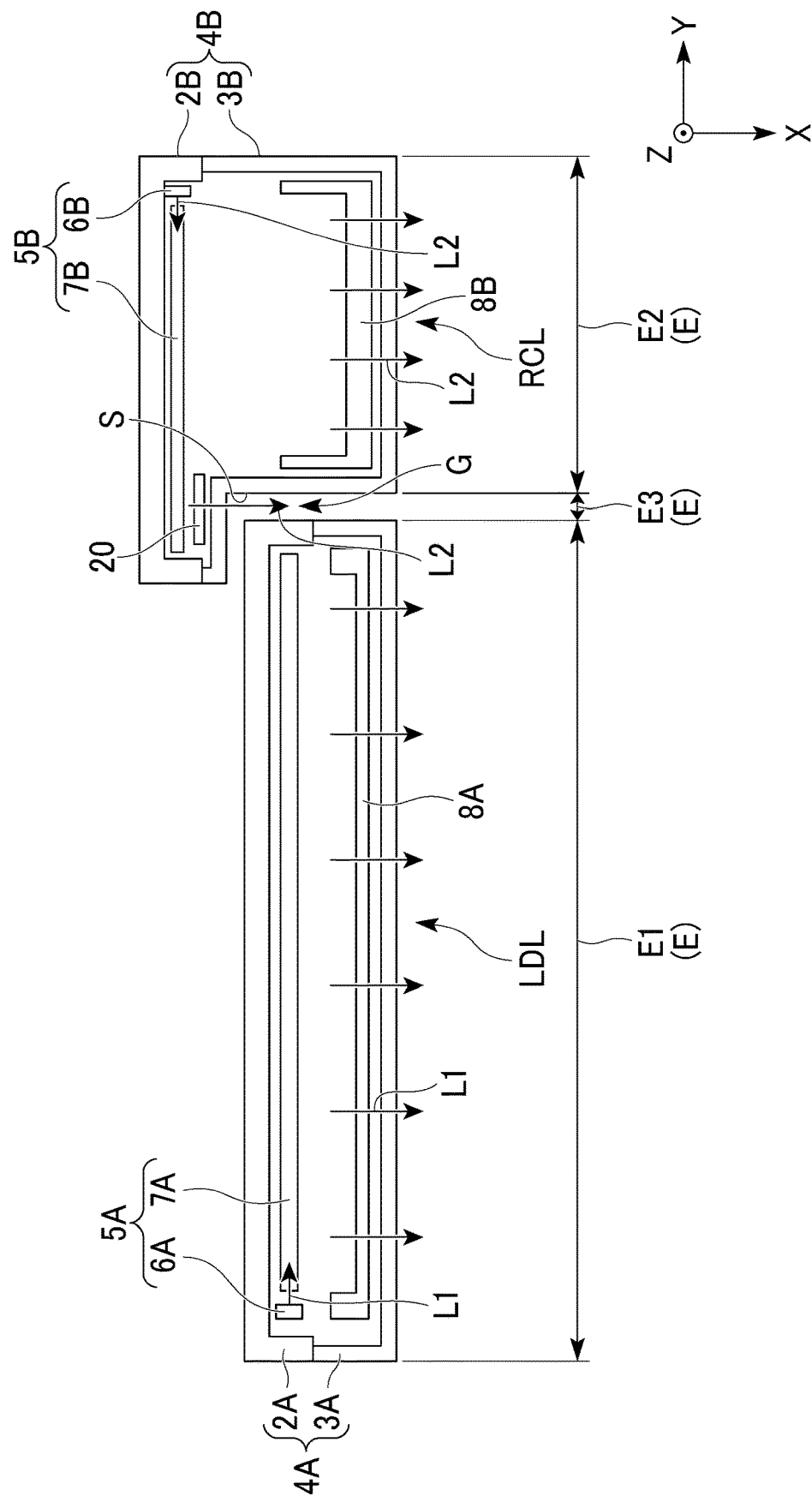
FIG. 9 is a cross-sectional view showing a variant of the vehicle lamp.

In addition, the above mentioned vehicle lamp 1, as shown in FIG. 9, may have a configuration in which a red transparent first inner lens 8A and second inner lens 8B is disposed between the first lens cover 3A and the second lens cover 3B, and the first light guide body 7A and the second light guide body 7B while using the colorless transparent first lens cover 3A and second lens cover 3B.

In the case of such configuration, the first inner lens 8A emits red light as a surface that constitutes the first light emitting area E1, and the second inner lens 8B emits red light as a surface that constitutes the second light emitting area E2.

Meanwhile, for the louver film 20, in order to emit red light as the surface that constitutes the third light emitting area E3, the red transparent light transmission layers 21 may be provided, or red transparent light transmissive films may be laminated on one surface of the louver film 20.

Figure 10:
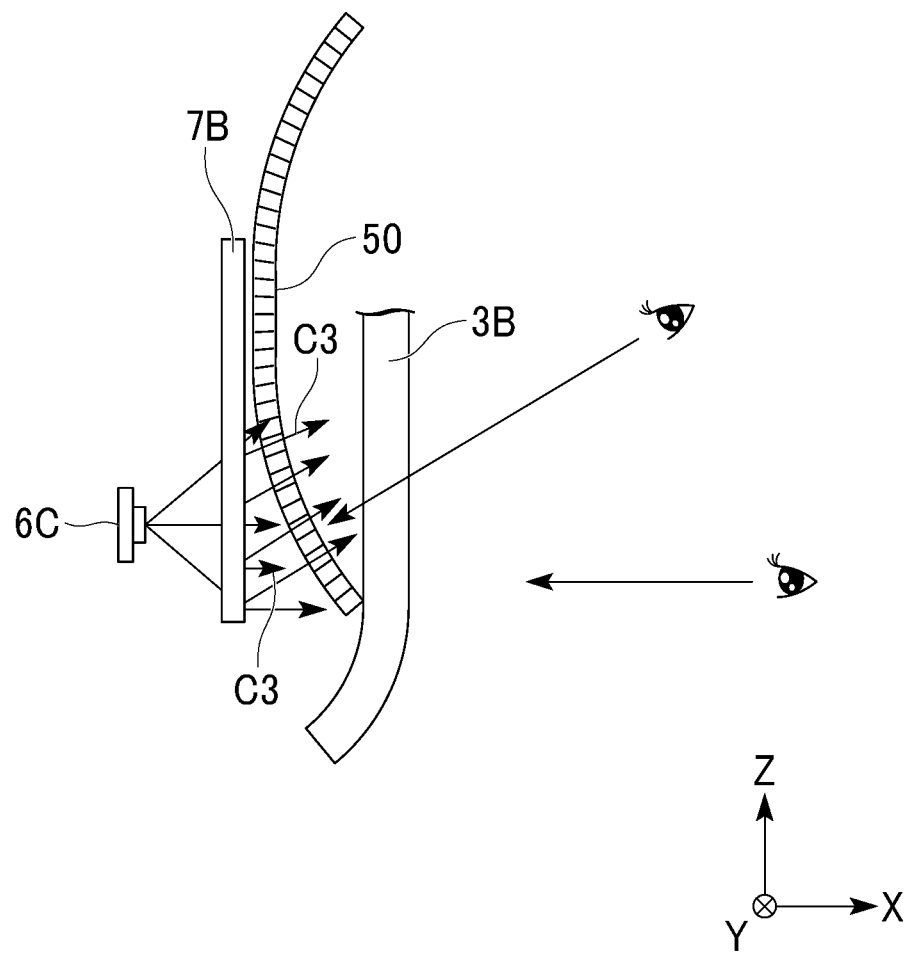
FIG. 10 is a cross-sectional view showing a variant of the vehicle lamp.
Figure 11:
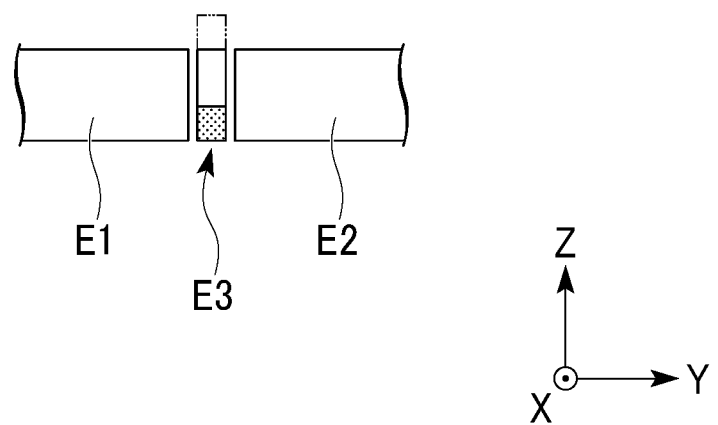
FIG. 11 is a schematic view of the vehicle lamp shown in FIG. 10 when the light emitting surface is seen from diagonally above.

In addition, in the vehicle lamp 1, as shown in FIG. 10, a configuration in which an auxiliary light source 6C configured to emit the third light L3 toward a lower side of the third light emitting area E3 is disposed and in which a function that blocks third light L3 emitted from the auxiliary light source 6C when the light emitting surface E is seen in a front view, and that transmits the third light L3 emitted from the auxiliary light source 6C when the light emitting surface E is seen from a view from diagonally above is given to the louver film 20 may be provided.

Specifically, the auxiliary light source 6C is disposed to overlap the third light emitting area E3 on the back surface side of the second light guide body 7B when seen in a front view. The louver film 20 is provided in a state in which the lower side is inclined toward the front surface side (the side of the second lens cover 3B).

In the case of such configuration, when the light emitting surface E is seen from a view from diagonally above, among the third light L3 emitted from the auxiliary light source 6C, the third light L3 directed diagonally upward is not blocked by the light shielding films 22 of the louver film 20 and transmits through the light transmission layers 21. Meanwhile, the third light L3 directed toward the front surface side is blocked by the light shielding films 22 when enters the lower side of the louver film 20.

Figure 12:
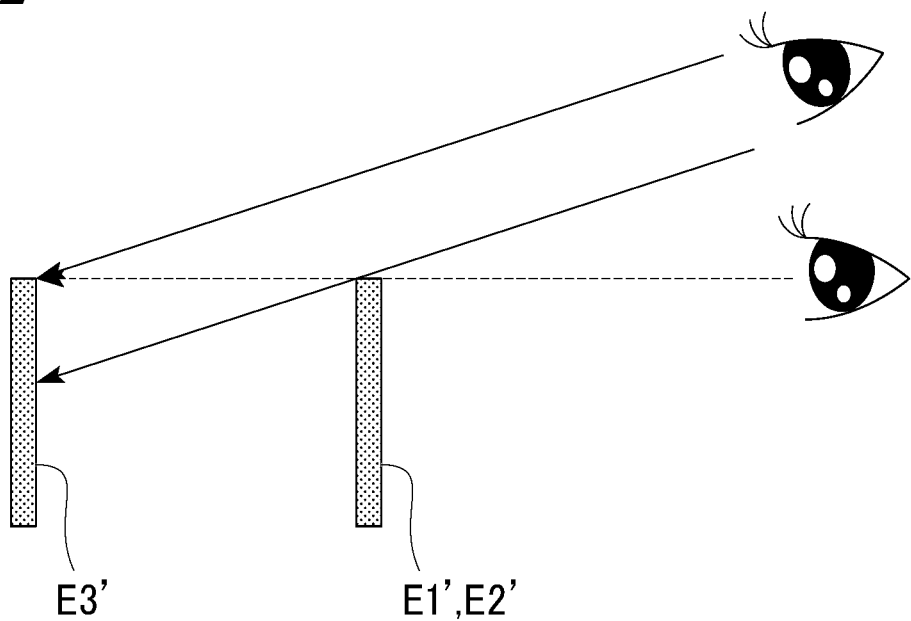
FIG. 12 is a schematic view for describing a case in which a viewing direction with respect to a light emitting surface of a vehicle lamp in the related art is changed from a front view to an obliquely upward view.
Figure 13:
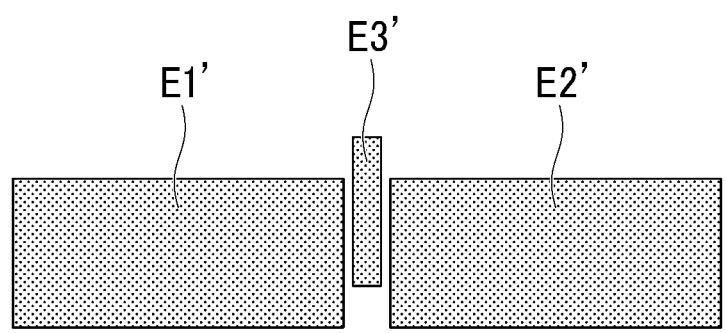
FIG. 13 is a schematic view of the vehicle lamp shown in FIG. 12 when the light emitting surface is seen from diagonally above.

Accordingly, as shown in FIG. 12, when the light emitting surface E is seen from a view from diagonally above, among the third light emitting area E3 disposed on the back surface side of the first light emitting area E1 and the second light emitting area E2, by making the lower side between the first light emitting area E1 and the second light emitting area E2 emit light by the third light L3, and thus, it is possible to further improve the connection feeling (uniformity) of light emission between the lid lamp LID and the rear combination lamp RCL.

Further, in the vehicle lamp 1, the second light emitting area E2 can function as both of a tail lamp and a brake lamp by strongly emitting red light in the second light emitting area E2 upon braking.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle lamp in which rear combination lamps mounted on both corner portions of a rear end side of a vehicle and a lid lamp mounted on a back gate or a trunk lid of the vehicle are arranged in a vehicle width direction,
   wherein the lid lamp has a configuration in which
      a first lighting unit is disposed inside a first lighting body constituted by a first housing having a front surface that is open and a first lens cover configured to cover an opening of the first housing, and
      the first lighting unit causes a first light emitting area to emit light, the rear combination lamp has a configuration in which
      a second lighting unit is disposed inside a second lighting body constituted by a second housing having a front surface that is open and a second lens cover configured to cover an opening of the second housing, and
      the second lighting unit causes each of a second light emitting area and a third light emitting area to emit light, the third light emitting area being an area provided between the first light emitting area and the second light emitting area and positioned at a back side than the first light emitting area and the second light emitting area,
   the first light emitting area, the second light emitting area and the third light emitting area constitute a light emitting surface continuous in the vehicle width direction when seen in a front view,
   a function member is disposed between the second lens cover and the second lighting unit so as to overlap the third light emitting area when seen in a front view, and
   the function member has a function of, when the light emitting surface is seen in a front view, transmitting through light emitted in the third light emitting area, and a function of, when the light emitting surface is seen from a view from diagonally above, blocking light emitted above the first light emitting area and the second light emitting area among the light emitted in the third light emitting area, and transmitting through light emitted between the first light emitting area and the second light emitting area among the light emitted in the third light emitting area wherein the function member is constituted by a louver film.

2. The vehicle lamp according to claim 1, wherein the louver film is constituted by light shielding films that are interposed between each of light transmission layers overlapping in an upward/downward direction, and
   the louver film is provided in a state in which an upper side thereof is inclined toward a front surface side.

3. The vehicle lamp according to claim 1, wherein the louver film is constituted by light shielding films that are interposed between each of light transmission layers overlapping in an upward/downward direction, and
   the louver film is provided in a state in which an interval between the light shielding films arranged in the upward/downward direction is made smaller at an upper part of the louver film.

4. The vehicle lamp according to claim 1, wherein the louver film is constituted by light shielding films that are interposed between each of light transmission layers overlapping in an upward/downward direction, and
   the louver film is provided in a state in which the light shielding film in an upper side of the louver film is inclined upward.

5. The vehicle lamp according to claim 1, wherein a surface of the first lens cover corresponding to the first light emitting area and a surface of the second lens cover corresponding to the second light emitting area are disposed on a same plane on a front surface side,
   a step surface is provided between the surface of the second lens cover corresponding to the second light emitting area and a surface of the second lens cover corresponding to the third light emitting area, and
   the surface of the second lens cover corresponding to the third light emitting area is disposed on a back surface side of the first housing and is provided while facing a part of the first housing.

6. The vehicle lamp according to claim 1, wherein the rear combination lamp comprises an auxiliary light source configured to emit light toward a lower side of the third light emitting area, and
   the function member has a function of blocking light emitted from the auxiliary light source when the light emitting surface is seen in a front view and of transmitting through light emitted from the auxiliary light source when the light emitting surface is seen from a view from diagonally above.

* * * * *